United States Patent
Murai (10) Patent No.: US 7,072,459 B2
(45) Date of Patent: Jul. 4, 2006

(54) METHOD AND APPARATUS FOR WEB DIRECT-DIALING CONNECTION

(75) Inventor: Toshio Murai, Ichikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 693 days.

(21) Appl. No.: 10/206,944

(22) Filed: Jul. 30, 2002

(65) Prior Publication Data

US 2003/0048892 A1    Mar. 13, 2003

(30) Foreign Application Priority Data

Sep. 13, 2001    (JP)    ............................. 2001-278479

(51) Int. Cl.
*H04M 7/00*    (2006.01)

(52) U.S. Cl. ...................... 379/231; 379/233

(58) Field of Classification Search ........... 379/211.01, 379/211.02, 218.01, 265.01, 265.02, 265.09, 379/93.01, 93.12, 231, 233, 234, 900
See application file for complete search history.

(56) References Cited

U.S. PATENT DOCUMENTS

| | | | | |
|---|---|---|---|---|
| 5,850,433 A | * | 12/1998 | Rondeau | 379/218.01 |
| 5,926,754 A | * | 7/1999 | Cirelli et al. | 455/417 |
| 6,373,836 B1 | * | 4/2002 | Deryugin et al. | 370/352 |
| 6,381,325 B1 | * | 4/2002 | Hanson | 379/218.01 |
| 6,404,876 B1 | * | 6/2002 | Smith et al. | 379/218.01 |
| 6,404,877 B1 | * | 6/2002 | Bolduc et al. | 379/218.01 |
| 6,459,779 B1 | * | 10/2002 | Wardin et al. | 379/112.01 |
| 6,473,612 B1 | * | 10/2002 | Cox et al. | 455/414.2 |
| 6,628,772 B1 | * | 9/2003 | McGrath et al. | 379/218.01 |
| 6,636,590 B1 | * | 10/2003 | Jacob et al. | 379/114.05 |
| 6,639,975 B1 | * | 10/2003 | O'Neal et al. | 379/112.01 |
| 6,721,401 B1 | * | 4/2004 | Lee et al. | 379/93.17 |

* cited by examiner

*Primary Examiner*—Bing Q. Bui
(74) *Attorney, Agent, or Firm*—Finnegan, Henderson, Farabow, Garrett & Dunner, L.L.P.

(57) ABSTRACT

A Web server provides the following service when being accessed by a telephone with a browser via the Internet, the server transfers a list of extension groups and the persons in charge belonging to the groups to the telephone. After the desired person in charge is selected from the list on the telephone, the server notifies the telephone of an outside-line telephone number direct-dialing-connectable to the telephone used by the person in charge. The server informs a private branch exchange of information including the telephone number of the telephone and the extension number of the extension telephone used by the person in charge. Thereafter, the private branch exchange, when receiving an incoming call from the telephone, directly calls up the extension telephone with the extension number previously notified by the server.

14 Claims, 5 Drawing Sheets

| OUTSIDE-LINE TELEPHONE NUMBER | EXTENSION GROUP | EXTENSION NUMBER |
|---|---|---|
| 03-XXXX-1111 | X | 2001<br>2002<br>2003 |
| 03-XXXX-1112 | Y | 3001<br>3002<br>3003 |

FIG. 3

| OUTSIDE-LINE TELEPHONE NUMBER | EXTENSION GROUP | EXTENSION NUMBER | PERSON IN CHARGE | COMMUNICATION STATE | PERSON-IN-CHARGE STATE | MOBILE PHONE NUMBER OF PERSON IN CHARGE |
|---|---|---|---|---|---|---|
| 03-XXXX-1111 | X | 2001<br>2002<br>2003 | A<br>B<br>C | IDLE<br>BUSY<br>BUSY | ABSENT<br>PRESENT<br>PRESENT | 090-YYY-XXX-201<br>090-YYY-XXX-202<br>090-YYY-XXX-203 |
| 03-XXXX-1112 | Y | 3001<br>3002<br>3003 | D<br>E<br>F | IDLE<br>IDLE<br>CALL ORIGINATING | REFUSING AN INCOMING CALL<br>PRESENT<br>PRESENT | 090-YYY-XXX-301<br>090-YYY-XXX-302<br>090-YYY-XXX-303 |

| EXTENSION GROUP | PERSON IN CHARGE |
|---|---|
| X | A<br>B<br>C |
| Y | D<br>E<br>F |

FIG. 4

| TIME | SOURCE | DIRECT-DIALING NUMBER | DESTINATION |
|---|---|---|---|
| 09:20 | 03-1234-4567 | 03-XXXX-1111 | 2001 |
| 09:23 | 06-4567-1234 | 03-XXXX-1112 | 3003 |
| 10:01 | 090-ZZZ-YYY-111 | 03-XXXX-1112 | 3002 |

METHOD AND APPARATUS FOR WEB DIRECT-DIALING CONNECTION

CROSS-REFERENCE TO RELATED APPLICATIONS

This application is based upon and claims the benefit of priority from the prior Japanese Patent Application No. 2001-278479, filed Sep. 13, 2001, the entire contents of which are incorporated herein by reference.

BACKGROUND OF THE INVENTION

1. Field of the Invention

This invention relates to an internal telephone communication system interlocked with extension telephone directory service by a Web browser, and more particularly to a method and apparatus for Web direct-dialing connection which, when receiving an incoming call via a public switched telephone network from a telephone with a Web browser, are best suited to directory call the other party to whom the user of the telephone wants to speak.

2. Description of the Related Art

A Private Branch Exchange (PBX) used in an internal telephone communication system has generally a direct-dialing function. The direct-dialing function is the function of, when the private branch exchange has received an incoming call via a public switched telephone network from an external telephone, or the calling telephone, causing an extension to receive the incoming call, that is, connecting the calling telephone to the extension. The following three types of direct-dialing functions are well known: a first function is a direct-in-line (DIL) function of causing a specific telephone or group to receive an incoming call for each physical line through which an incoming call has been received; a second function is a direct-in-dialing (DID) function of causing a specific telephone or group to receive an incoming call for each called telephone number; and a third function is a direct-in-dialing-with-additional-dial function of, after automatic response, causing the user of the calling telephone to select an extension number with the push buttons.

In an internal telephone communication system which includes a private branch exchange with such a direct-dialing function, for an external telephone to make a call to an extension telephone in the system via a public switched telephone network, the following procedure is necessary. First, the user of the external telephone dials the telephone for the group to which the other party belongs or a specific telephone capable of relaying to an extension telephone. When receiving an incoming call from the external telephone, the private branch exchange causes the telephone for the group or the specific telephone specified by the destination information, such as the dialed telephone number, to receive the incoming call.

The user (or calling user) of the external telephone or the calling telephone makes a call to the user of the telephone of the called group or the specific telephone. In the call to the called user, the calling user requests the called user to operate to transfer the call to the extension telephone allocated to the desired called party (in the case of the first or second function). When the telephone of the called group or the specific telephone has an automatic response function, an automatic response from the automatic response telephone prompts the calling user to enter the extension number of the desired called party with the push buttons. In this case, an incoming call is received by the extension telephone to which the entered extension number has been allocated (in the case of the third function). When an outside-line telephone number has been assigned to the telephone that can be used by the desired called party, the calling user can make a call to the desired called party by just dialing the outside-line telephone number.

As described above, for a telephone outside the internal telephone system to dial the telephone the called party can use via the public switched telephone network, the user of the external telephone (or the calling user) has to perform the following operations. The calling user performs an operation once to dial the telephone of the group or the specific telephone unless an outside-line telephone number has been allocated to the telephone the called party uses. Then, the calling user must ask the group or the user of the specific telephone (the called user) to transfer the call to the telephone the desired called party can use. Therefore, the communication time and the charge for a telephone call have been wasted.

BRIEF SUMMARY OF THE INVENTION

It is accordingly an object of the present invention to provide a method and an apparatus for Web direct-dialing connection which, when a private branch exchange has received an incoming call via a public switched telephone network from a telephone with a Web browser, enable the called party to whom the user of the telephone wants to speak to be called up directly by interlocking with extension telephone directory service by the Web browser.

According to an aspect of the present invention, there is provided a method of connecting a Web telephone with a Web browser (herein after call a web telephone) via a public switched telephone network to an extension of a private branch exchange. This method comprises transferring, transmitting data representing the number of an outside-line telephone, transmitting direct-dialing connection information, and causing the private branch exchange to call and to connect. In the transferring, when the Web telephone requests extension telephone directory service from a specific Web server via the Internet, the Web server transfers a list including the extension groups managed by the private branch exchange and the persons in charge belonging to the groups to the Web telephone via the Internet. In the transmitting data representing the number of an outside-line telephone, when a person in charge is selected from the list on the Web telephone, the Web server transmits the outside-line telephone number direct-dialing-connectable to the telephone used by the selected person in charge to the Web telephone via the Internet. In the transmitting direct-dialing connection information, the Web server transmits the direct-dialing connection information to the private branch exchange via a specific communication path. The direct-dialing connection information includes the telephone number of the Web telephone and the extension number of the extension telephone used by the selected person in charge. In the causing the private branch exchange to call and to connect, when the private branch exchange receives an incoming call from the Web telephone that has received the outside-line telephone number, the private branch exchange calls the extension telephone of the number transmitted from the Web server to the private branch exchange and connects the extension telephone to the Web telephone.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
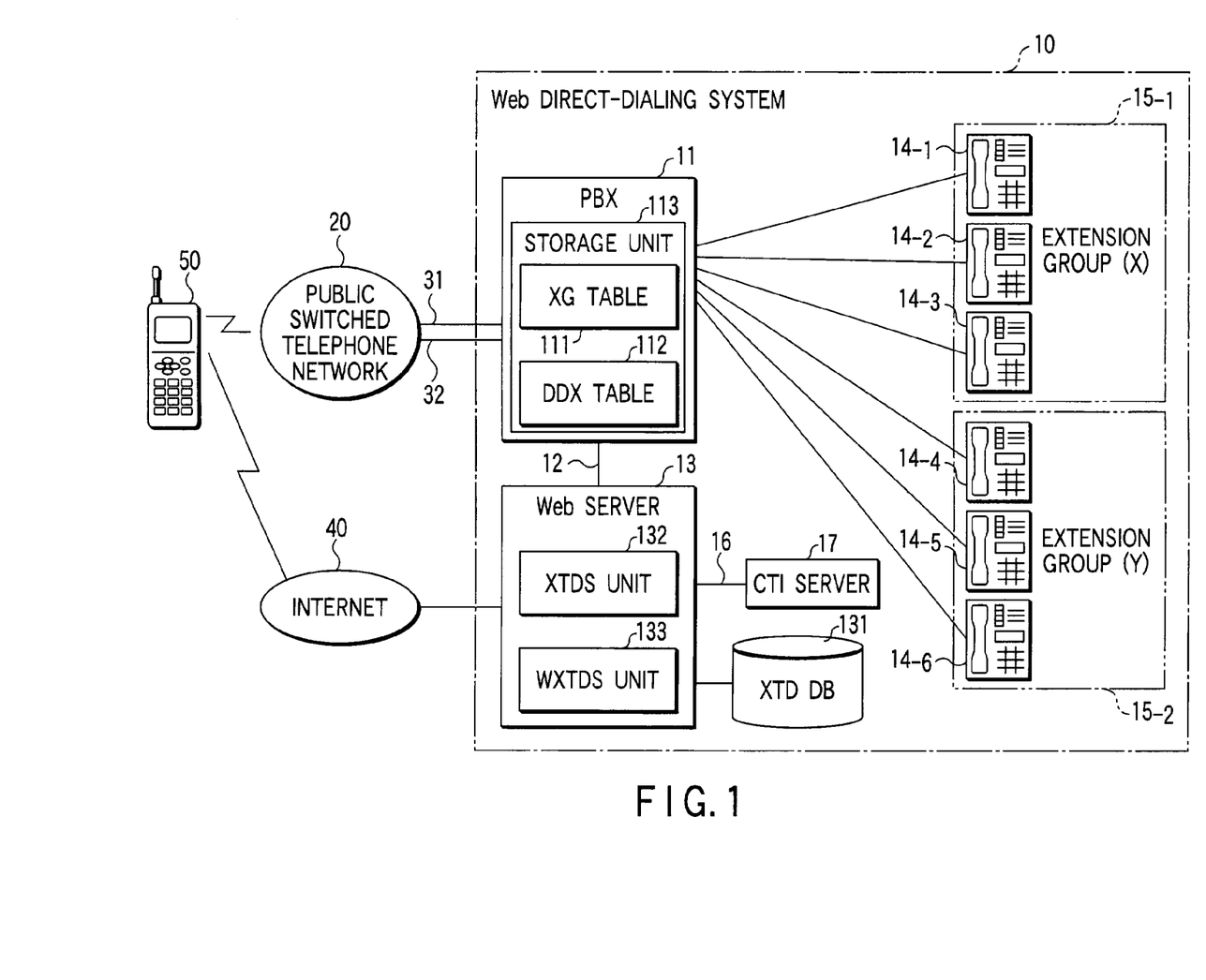
FIG. 1 shows the configuration of a Web direct-dialing system according to an embodiment of the present invention.

FIG. 1 shows the configuration of an internal telephone communication system with a Web direct-dialing function (hereinafter, referred to as a Web direct-dialing system) according to an embodiment of the present invention. In FIG. 1, the Web direct-dialing system 10 mainly comprises a private branch exchange 11 (PBX) and a Web server (or Web server computer) 13 connected via a communication path 12 to the private branch exchange 11. The private branch exchange 11 is connected to a public switched telephone network 20 via, for example, two telephone lines 31, 32. Outside-line telephone numbers "03-XXXX-1111" and "03-XXXX-1112" have been allocated to the telephone lines 31, 32, respectively.

The private branch exchange 11 is of the circuit switching type or the VoIP (Voice over IP) type. A plurality of extension telephones, for example, six extension telephones 14-1 to 14-6 are connected to the private branch exchange 11. Of them, the extension telephones 14-1 to 14-3 belong to an extension group 15-1 to which outside-line telephone number "03-XXXX-1111" has been allocated. The extension telephones 14-4 to 14-6 belong to an extension group 15-2 to which outside-line telephone number "03-XXXX-1112" has been allocated. The group number of the extension group 15-1 is X and the group number of the extension group 15-2 is Y. The users (or persons in charge) of the extension telephones 14-1, 14-2, 14-3 belonging to the extension group 15-1 are A, B, and C, respectively. The users (or persons in charge) of the extension telephone 14-4, 14-5, 14-6 belonging to the extension group 15-2 are D, E, and F, respectively. The extension numbers of the extension telephones 14-1, 14-2, 14-3 belonging to the extension group 15-1 are 2001, 2002, and 2003, respectively. The extension numbers of the extension telephones 14-4, 14-5, 14-6 belonging to the extension group 15-2 are 3001, 3002, and 3003, respectively.

The contents of the setting of the extension telephones 14-1 to 14-6 are summarized as follows:

(1) Extension telephone 14-1 is an extension telephone whose extension number is 2001 and which is used by person A. Extension telephone 14-1 belongs to extension group X.

(2) Extension telephone 14-2 is an extension telephone whose extension number is 2002 and which is used by person B. Extension telephone 14-2 belongs to extension group X.

(3) Extension telephone 14-3 is an extension telephone whose extension number is 2003 and which is used by person C. Extension telephone 14-3 belongs to extension group X.

(4) Extension telephone 14-4 is an extension telephone whose extension number is 3001 and which is used by person D. Extension telephone 14-4 belongs to extension group Y.

(5) Extension telephone 14-5 is an extension telephone whose extension number is 3002 and which is used by person E. Extension telephone 14-5 belongs to extension group Y.

(6) Extension telephone 14-6 is an extension telephone whose extension number is 3003 and which is used by person F. Extension telephone 14-6 belongs to extension group Y.

The private branch exchange 11 includes an extension group table (XG table) 111 and a direct-dialing extension table (DDX table) 112. The table 111 is used to manage the relationship between the extension groups and the outside-line telephone numbers and others. The table 112 is used to manage the extension telephone numbers directly called on the basis of the pairs of calling telephone numbers and called outside-line telephone numbers (or direct-dialing numbers). The tables 111 and 112 are stored in a storage unit 113, such as a memory or a hard disk drive.

Figure 2:
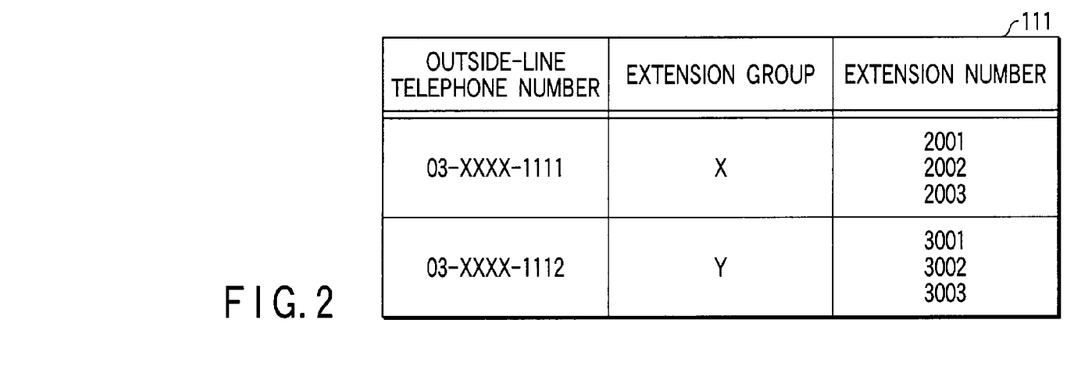
FIG. 2 is an extension group table (XG table) 111 in FIG. 1.

In each entry of the extension group table 111, a set of an outside-line telephone number, the extension group to which the outside-line telephone number has been allocated, and all the extension numbers belonging to the extension group is stored for each outside-line telephone number. An example of the table 111 is shown in FIG. 2. When there is an incoming call for telephone line 31 (with the outside-line telephone number "03-XXXX-1111") or telephone line 32 (with the outside-line telephone number "03-XXXX-1112"), the private branch exchange 11 performs a switching operation according to the contents of the table 111. Specifically, when there is an incoming call for telephone line 31 (with the outside-line telephone number "03-XXXX-1111"), the private branch exchange 11 calls up all the extension telephones 14-1 to 14-3 (whose extension numbers are 2001 to 2003, respectively) belonging to the extension group X. When there is an incoming call for telephone line 32 (with the outside-line telephone number "03-XXXX-1112"), the private branch exchange 11 calls up all the extension telephones 14-4 to 14-6 (whose extension numbers are 3001 to 3003, respectively) belonging to the extension group Y. In a case where information including a pair of the calling telephone number and the called outside-line telephone number and the extension number has been stored in the direct-dialing extension table 112 when there is an incoming call for the telephone line 31 or 32, the private branch exchange 11 calls up the extension telephone with the extension telephone number directly.

The Web server 13 includes an extension telephone directory database (XTD DB) 131, an extension telephone directory storing unit (XTDS unit) 132, and a Web extension telephone directory service unit (WXTDS unit) 133. The database 131 is stored in a storage unit, such as a hard disk unit. The Web server 13 is connected to a CTI server (or CTI server computer) 17 via a communication path 16. The CTI server 17 is a computer telephony integration server which manages the state of extension telephone users. The Web server 13 is connected to the Internet 40.

A Web telephone 50 has a Web browser capable of accessing the Web servers connected to the Internet 40, including the Web server 13. In the embodiment, the telephone 50 accesses the Web extension telephone directory service unit 133 of the Web server 13 and requests Web extension telephone directory service. The telephone number of the Web telephone 50 is assumed to be "090-ZZZ-YYY-111." In the embodiment, the telephone 50 is a mobile phone with a Web browser. The telephone 50 may be a fixed-line telephone, as long as it has a Web browser. Moreover, instead of the telephone 50, a mobile terminal which has both a Web browser and a telephone function may be used. Therefore, in the present invention, a mobile terminal with both a Web browser and a telephone function is also defined as a Web telephone.

Figure 3:
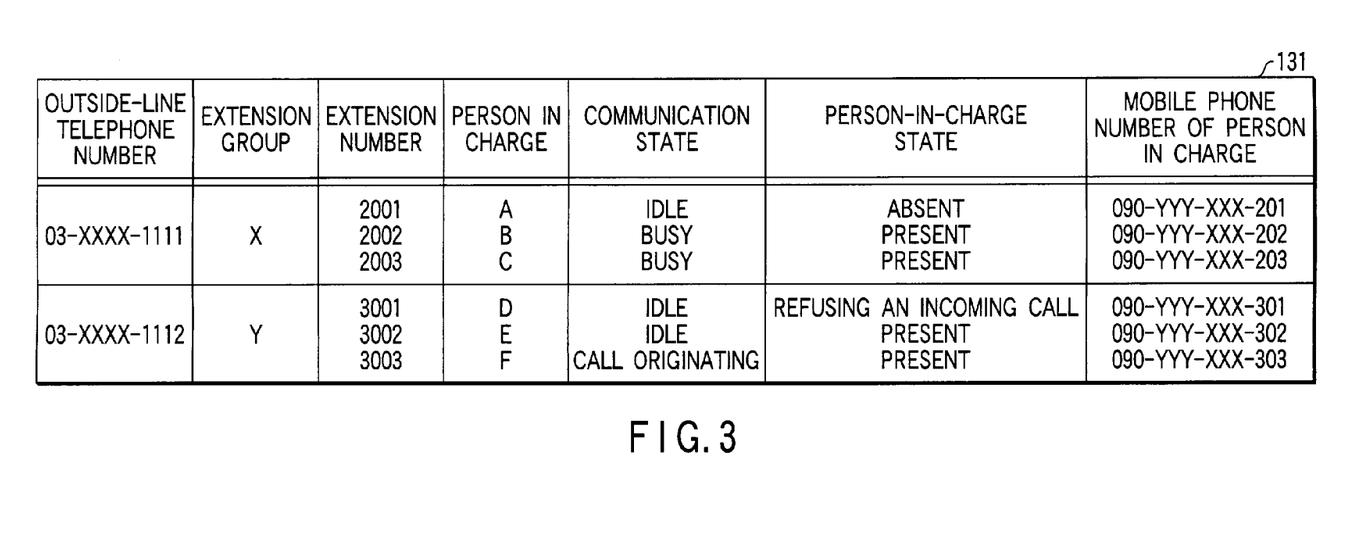
FIG. 3 shows an extension telephone directory database (XTD DB) 131 in FIG. 1.

FIG. 3 shows an example of the data structure of the extension telephone directory database 131. As shown in FIG. 3, in the database (XTD DB) 131, extension telephone directory data is stored for each of the outside-line numbers managed by the private branch exchange 11. The extension telephone directory data includes information about the corresponding outside-line telephone numbers, the extension groups to which the outside-line telephone numbers have been allocated, and all the extension numbers belonging to the extension groups. For each of the extension numbers belonging to the corresponding extension group, the extension telephone directory data includes information about the name of the user (or person in charge) of the extension telephone with the extension number, the communication state of the extension telephone, the state of the person in charge, and the telephone number (or mobile phone number) of the mobile phone the person in charge has.

The extension telephone directory storing unit 132 of the Web server 13 communicates with the private branch exchange 11 via the communication path 12. In this communication, the unit 132 acquires the individual outside-line telephone numbers, the extension groups to which the outside-line telephone numbers have been allocated, and the extension numbers belonging to the extension groups which have all been stored in the extension group table 111 in the private branch exchange 11. The unit 132 further acquires the communication state of the extension telephone to which the acquired extension number has been allocated and stores the acquired information into the extension telephone directory database 131. The communication state of the extension telephone includes, for example, idle, busy, dial call originating, and call incoming. The unit 132 further communicates with the CTI server 17 via the communication path 16. In this communication, the unit 132 acquires information about the state of the user (or person in charge) of each extension telephone and stores the acquired user state information into the extension telephone directory database 131 in such a manner that the acquired information corresponds to the extension number. The state of the user includes, for example, a presence state, an absence (or away-from-desk) state, an incoming call wait state, and an incoming call refuse state. In this way, the unit 132 constructs the database 131 by communicating with the private branch exchange 11 and CTI server 17.

The extension telephone directory storing unit 132 communicates regularly with the private branch exchange 11 and CTI server 17, thereby updating the contents of the extension telephone directory database 131, particularly the communication state of each extension telephone and the state of the user of each extension telephone to the latest state. If the private branch exchange 11 itself has the function of the CTI server, it can construct the database 131 by just communicating with the private branch exchange 11. Of the pieces of the information stored in the database 131, the communication state of the extension telephone and the state of the user of the extension telephone are not necessarily needed. In this case, the database 131 can be prepared in advance and the extension telephone directory storing unit 132 is not necessarily required. Of the pieces of the information stored in the database 131, the mobile phone number of the user of the extension telephones are not necessarily needed. The Web server 13 and CTI server 17 may be realized by the same computer.

In response to a request from a client terminal (in this case, Web telephone 50) accessed via the Internet 40, the Web extension telephone directory service unit 133 provides Web-based extension telephone directory service according to the extension telephone directory database 131. Although all of the information in the extension telephone directory database 131 may be opened, only part of the extension telephone directory database 131 is opened (or offered) to the requester in this embodiment. That is, in the embodiment, only information about the extension groups and the persons in charge belonging to the groups are opened. The reason is that the user of the client terminal (or Web telephone 50) has only to know the extension groups (corresponding to the posts) and the persons in charge belonging to the groups and does not require the telephone numbers at all. In this case, even if the telephone numbers (outside-line telephone numbers or extension numbers) are changed, there is no need to inform the user of the change.

The Web server 13 can realize the function of the extension telephone directory storing unit 132 and that of the Web extension telephone directory service unit 133 by executing specific programs installed from, for example, a recording medium, such as a CD-ROM, or the Internet 40 into a storage unit, such as a hard disk unit, the Web server 13 has.

Figure 6:
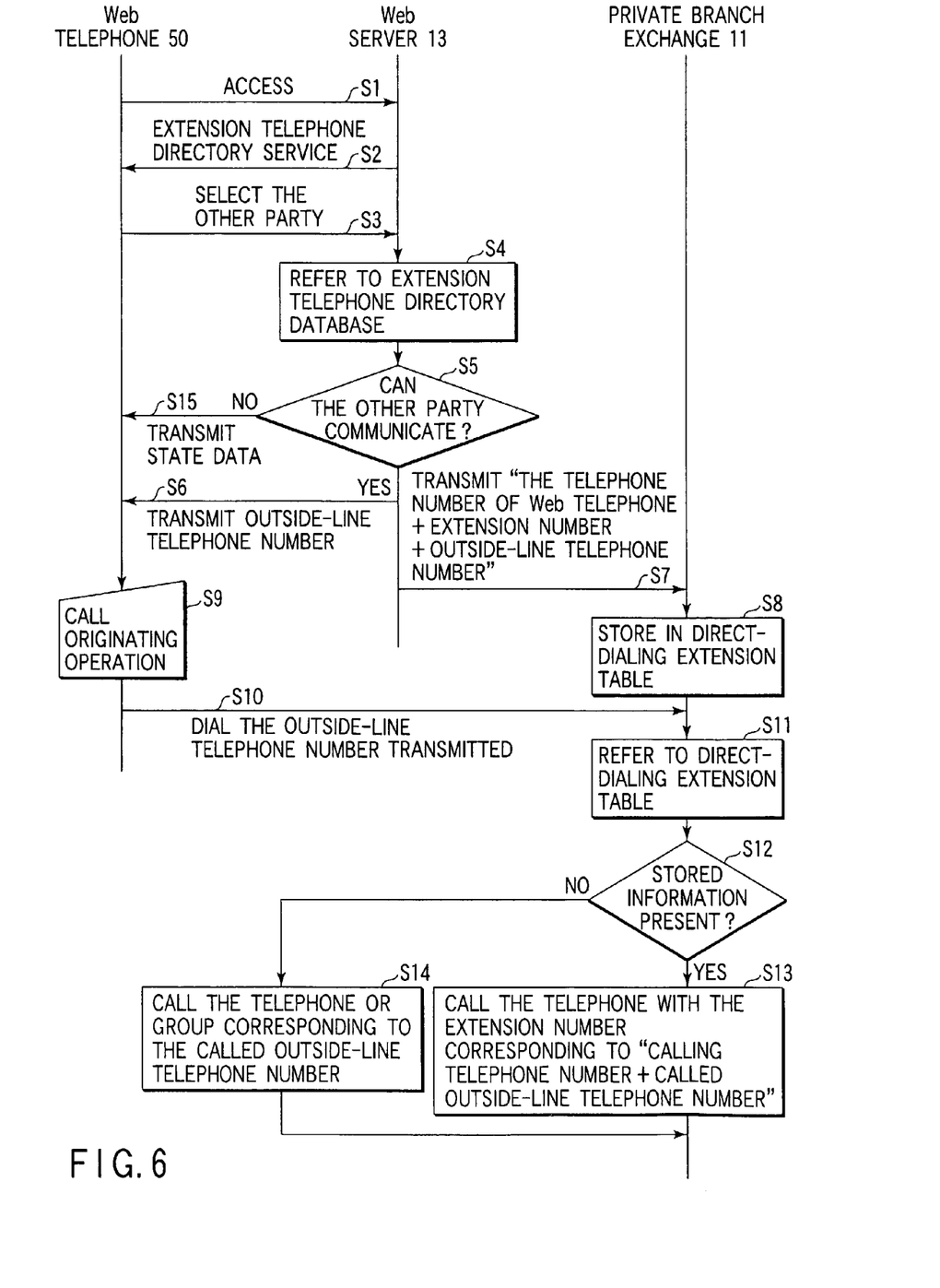
FIG. 6 is a sequence chart to help explain a direct-dialing connection process in the embodiment.

Next, the direct-dialing connection process in the Web direct-dialing system 10 of FIG. 1 will be explained by reference to a sequence chart in FIG. 6. Suppose the user of Web telephone 50 wants to directly dial an extension telephone in the Web direct-dialing system 10. In this case, the user of telephone 50 uses the Web browser of telephone 50 and sets an URL (Uniform Resource Locator) as location information to specify Web extension telephone directory service. Then, the telephone 50 is connected to the Web server 13 in the Web direct-dialing system 10 via the Internet 40 and accesses the Web server 13 (step SI). The telephone 50 then requests Web extension telephone directory service from (the Web extension telephone directory service unit 133 of) the Web server 13.

Figure 4:
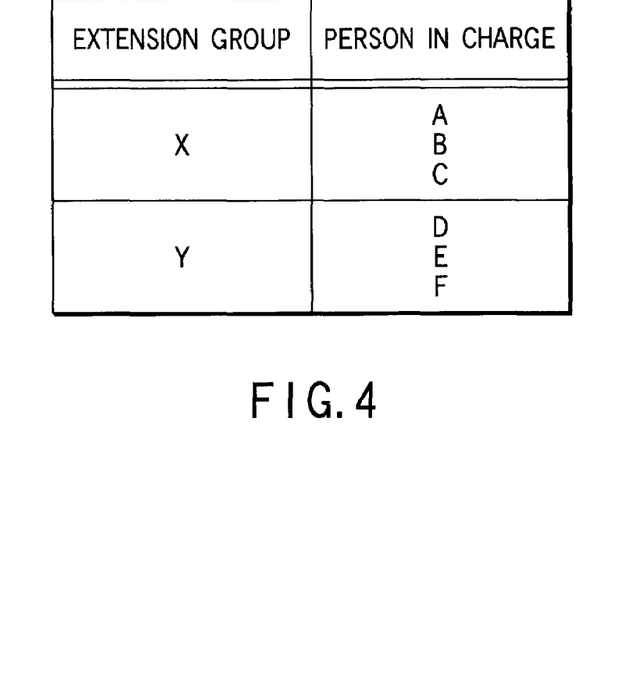
FIG. 4 shows a Web page transferred from a Web server 13 to a Web telephone 50.

In response to the Web extension telephone directory service request from the telephone 50, (the Web extension telephone directory service unit 133 of) the Web server 13 provides Web extension telephone directory service (step S2). In this service, information about all the extension groups and all the persons in charge belonging to the groups are taken out from the extension telephone directory database 131. A Web page made up of a list of the taken-out extension groups and persons in charge is transferred via the Internet to the Web telephone 50 of the requester and is displayed on the screen of the Web telephone 50. An example of the Web page is shown in FIG. 4.

The user of the Web telephone 50 selects a desired person in charge (assumed to be the other party) from the Web page transferred to the telephone 50 in the Web extension telephone directory service, that is, from the list of the extension groups and persons in charge. Then, information about the selection of the other party is transmitted to the Web server 13 (step S3). Suppose person E has been selected from the Web page (list) of FIG. 4 to make a call to person E belonging to extension group 15-2 (i.e., extension group Y) whose group number is Y.

Then, the Web server 13 refers to the extension telephone directory database 131 using the selected person E, that is, the person in charge E, as a key (step S4). The Web server 13 then determines whether a communication between person E (selected as the other party) and the user of the Web telephone 50 who has selected person E (step S5) is possible (step S5) on the basis of the communication state of the extension telephone 14-5 used by person E and the state of person E. If the communication is possible, the Web server 13 retrieves the outside-line telephone number "03-XXXX-1112" stored in the extension telephone directory database 131 so as to correspond to person E from the database 131 and transmits the number to the telephone 50 that has selected person E via the Internet 40 (step S6).

In addition to the outside-line telephone number "03-XXXX-1112," the Web server 13 further retrieves the extension number "3002" of the extension telephone 14-5 which can be used by person E and which has been stored in the extension telephone directory database 131 so as to correspond to person E. Moreover, the Web server 13 acquires the telephone number "090-ZZZ-YYY-111" of the Web telephone 50 that has selected person E. The Web server 13 transmits, to the private branch exchange 11 via the communication path 12, the acquired extension number "3002" of the extension telephone 14-5 and the telephone number "090-ZZZ-YYY-001" of the Web telephone 50, and the previously retrieved outside-line telephone number "03-XXXX-1112" (step S7).

Figure 5:
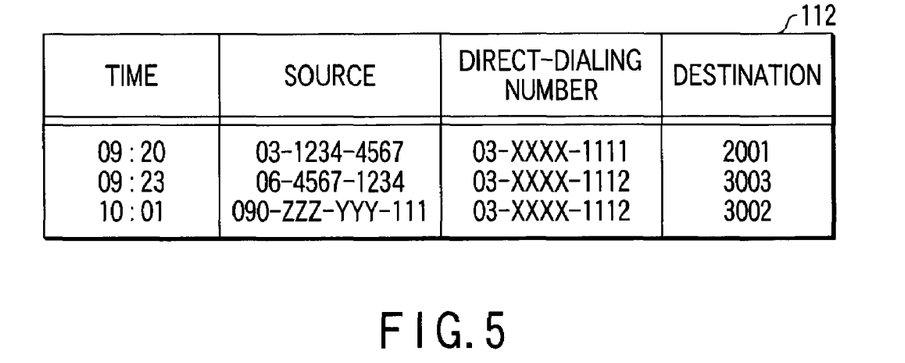
FIG. 5 is a direct-dialing extension table (DDX table) 112 in FIG. 1.

Then, the private branch exchange 11 stores direct-dialing connection information (or entry information) into a blank entry of the direct-dialing extension table 112 (step S8). The direct-dialing connection information includes the telephone number "090-ZZZ-YYY-111" of the Web telephone 50, outside-line telephone number "03-XXXX-1112," extension number "3002," and time information representing the time (for example, 10:01) at that time which have been given by the Web server 13. FIG. 5 shows an example of the direct-dialing extension table 112 at this time. The telephone number "090-ZZZ-YYY-001" of the Web telephone 50 in the direct-dialing connection information is the telephone number of the call originating side. The outside-line telephone number "03-XXXX-1112" is the outside-line telephone number connected by direct dialing. The extension number "3002" is the extension number of the extension telephone 14-5 used by person E selected by the Web telephone 50, that is, the extension number called by direct dialing.

On the other hand, when being told the outside-line telephone number "03-XXXX-1112" by the Web server 13 (step S6), the user of the Web telephone 50 judges that it is possible to communicate with the previously selected person E at the present time. In this case, the user of the Web telephone 50 performs an operation to dial the outside-line telephone number "03-XXXX-1112" (step S9). As a result, the Web telephone 50 originate a dial call to the outside-line telephone number "03-XXXX-1112" via the public switched telephone network 20 (step S10). Then, the Web telephone 50 is connected via the public switched telephone network 20 and the telephone line 32 to the private branch exchange 11.

Then, the private branch exchange 11, referring to the direct-dialing extension table 112, checks to see if the direct-dialing connection information including a pair of the telephone number (the calling party's telephone number) "090-ZZZ-YYY-111" of the calling Web telephone 50 and the outside-line telephone number (or direct-dialing number) allocated to the telephone line 32 has been stored (steps S11, S12). In the example of FIG. 5, in the direct-dialing extension table 112, the desired direct-dialing connection information including a pair of the telephone numbers "090-ZZZ-YYY-111" and "03-XXXX-1112" and the extension number (or the extension number to be called directly) "3002" have been stored. In this case, the private branch exchange 11 determines that a call request for the telephone line 32 (03-XXXX-1112) made by the calling Web telephone 50 (090-ZZZ-YYY-111) has only to be forwarded to the extension number in the direct-dialing connection information, that is, "3002." Thus, the private branch exchange 11 takes out the extension number "3002" in the direct-dialing connection information from the direct-dialing extension table 112 and calls up the extension telephone with that extension number directly (step S13).

In the embodiment, when the user of the Web telephone 50 accesses the Web server 13 from the Web telephone 50, the Web server 13 performs the transmission of the direct-dialing connection information to the private branch exchange 11, in interlock with the extension telephone directory service that the Web server 13 offers to the Web telephone 50. This enables the other party to whom the user of the telephone 50 wants to speak to be called directly even if the user is not put through to the pilot number as in the prior art in a case where the private branch exchange 11 has received an incoming call from the Web telephone 50 via the public switched telephone network 20. The calling is done as follows. The user of the Web telephone 50 knows the URL for the Web extension telephone directory service. Alternatively, the URL has been stored in the Web telephone 50. On the basis of the URL, the user, from the Web telephone 50, requests the Web server 13 for the Web extension telephone directory service. In this case, the user of the Web telephone 50 may neither know the telephone number of the other party nor be put through to the other party by a third party.

Furthermore, in the embodiment, the direct-dialing connection information transmitted to the private branch exchange 11 includes the outside-line telephone number direct-dialing-connectable to the selected person in charge. Therefore, when the private branch exchange 11 has received an incoming call from the Web telephone 50, the private branch exchange 11 can check not only the calling telephone number in the direct-dialing connection information already transmitted from the Web server 13 to the private branch exchange 11 but also the called outside-line telephone number and call the extension telephone with the corresponding extension number directly. This prevents the mistake described below.

It is assumed that the called outside-line telephone number is not included in the direct-dialing connection information and only the calling telephone number is checked when there is an incoming call for the private branch exchange 11.

Moreover, suppose there are a plurality of telephone numbers (or outside-line telephone numbers) for the lines connected to the private branch exchange 11 via the public network 20. With this configuration, when an outside-line telephone number different from the outside-line telephone number direct-dialing-connectable to the selected person in charge is dialed, there erroneously occurs an incoming call for an unexpected specific extension telephone. In the embodiment, such errors can be prevented.

Next, a case where the desired direct-dialing connection information (or entry information) has not been stored in the direct-dialing extension table 112 will be explained. In this case, the private branch exchange 11 carries out a calling operation as in the prior art (step S14). Specifically, the private branch exchange 11 refers to the extension group table 111, using the outside-line telephone number "03-XXXX-1112" allocated to the telephone line 32 as a key, and calls up the telephone or group corresponding to the outside-line telephone number "03-XXXX-1112." Since the contents of the extension group table 111 are as shown in FIG. 2, all the extension telephones 14-4 to 14-6 belonging to the extension group Y (or the extension group 15-2 with the group number Y) are called up.

Next, explanation will be given about the operation when the Web server 13 has determined that a communication between the user of the Web telephone 50 and the person in charge E selected from the Web page (or list) of FIG. 3 is impossible. In this case, the Web server 13 transmits to the Web telephone 50 requesting service the data indicating that the communication is impossible (step S15). The data includes not only the outside-line telephone number "03-XXXX-1112" stored in the extension telephone database 131 corresponding to the selected person "E" but also information indicating the factor that make the communication impossible. Specifically, when the fact that the extension telephone 14-5 used by person E is busy or is originating a call has been shown in the communication state information stored in the extension telephone directory database 131, the Web telephone 50 receives the communication state information. When the fact that person E is out or away from his or her desk, or is absent, or that person E is in the incoming call refuse state has been shown in the person-in-charge state information stored in the extension telephone directory database 131, the Web telephone 50 receives the person-in-charge state information.

Consequently, the user of the Web telephone 50 can judge before making a call that the other party is in a state where he or she cannot receive a call. Furthermore, the user of the telephone 50 can understand the reason why the other party cannot receive a call. That is, the user of the telephone 50 can judge that the other party is at his or her desk, but cannot receive a call because being on another line or that the other party is out and cannot receive a call. Therefore, the user of the Web telephone 50 refrains from dialing the outside-line telephone number "03-XXXX-1112" at present, thereby preventing useless calls from being exchanged. When the other party cannot receive a call because being on another line, the user can dial the outside-line telephone number notified, for example, 30 seconds later or several minutes later. In place of the dialing operation, the Web telephone 50 can automatically request the Web extension telephone directory service of the Web server 13 again, for example, 30 seconds later or several minutes later. When the Web telephone 50 requests the Web extension telephone directory service again, there is no need to insert the outside-line telephone number "03-XXXX-1112" into the information transmitted from the Web server 13 to the Web telephone 50 requesting the service.

Furthermore, in the embodiment, when person E is out, if information indicating means which enables the user to make a call to person E, for example, person E's mobile phone number, has been stored in the extension telephone directory database 131, the mobile phone number is also transmitted from the Web server 13 to the Web telephone 50. In this case, the mobile phone number transmitted should be dialed from the Web telephone 50 manually or automatically. This enables the user of the telephone 50 to make direct contact with person E even if person E is out and the user doesn't know person E's mobile phone number. In this case, there is no need for the Web server 13 to transmit information indicating means which enables the user to make a call to person E to the private branch exchange 11 via the communication path 12. When person E is out, the information (contact telephone number) indicating means which enables the user to make a call to person E at that time includes not only the mobile phone number but also the telephone number (of a telephone placed) in another place where person E can receive a call.

It is assumed that, in step S8, direct-dialing connection information including the calling telephone number "090-ZZZ-YYY-111," the outside-line telephone number "03-XXXX-1112" subjected to direct-dialing connection, and the extension number "3002" to be directly dialed has been stored in the direct-dialing extension table 112. In this case, from this time on, when the Web telephone 50 with the telephone number "090ZZZ-YYY-111" dials the telephone number "03-XXXX-1112," an incoming call is always received by the extension telephone 14-5 with the extension number "3002." The user of the Web telephone 50 might want to make a call to the user of another extension telephone belonging to the same extension group 15-2 as that of the extension telephone 14-5.

To comply with the wish, information indicating the storing time of the information is included in the direct-dialing connection information as shown in FIG. 5 in the embodiment. Then, when a specific time has elapsed since the time shown by the time information in the direct-dialing connection information, the private branch exchange 11 deletes the direct-dialing connection information from the direct-dialing extension table 112. The procedure for deleting the direct-dialing connection information (or entry information) will be explained by reference to a flowchart in FIG. 7.

Figure 7:
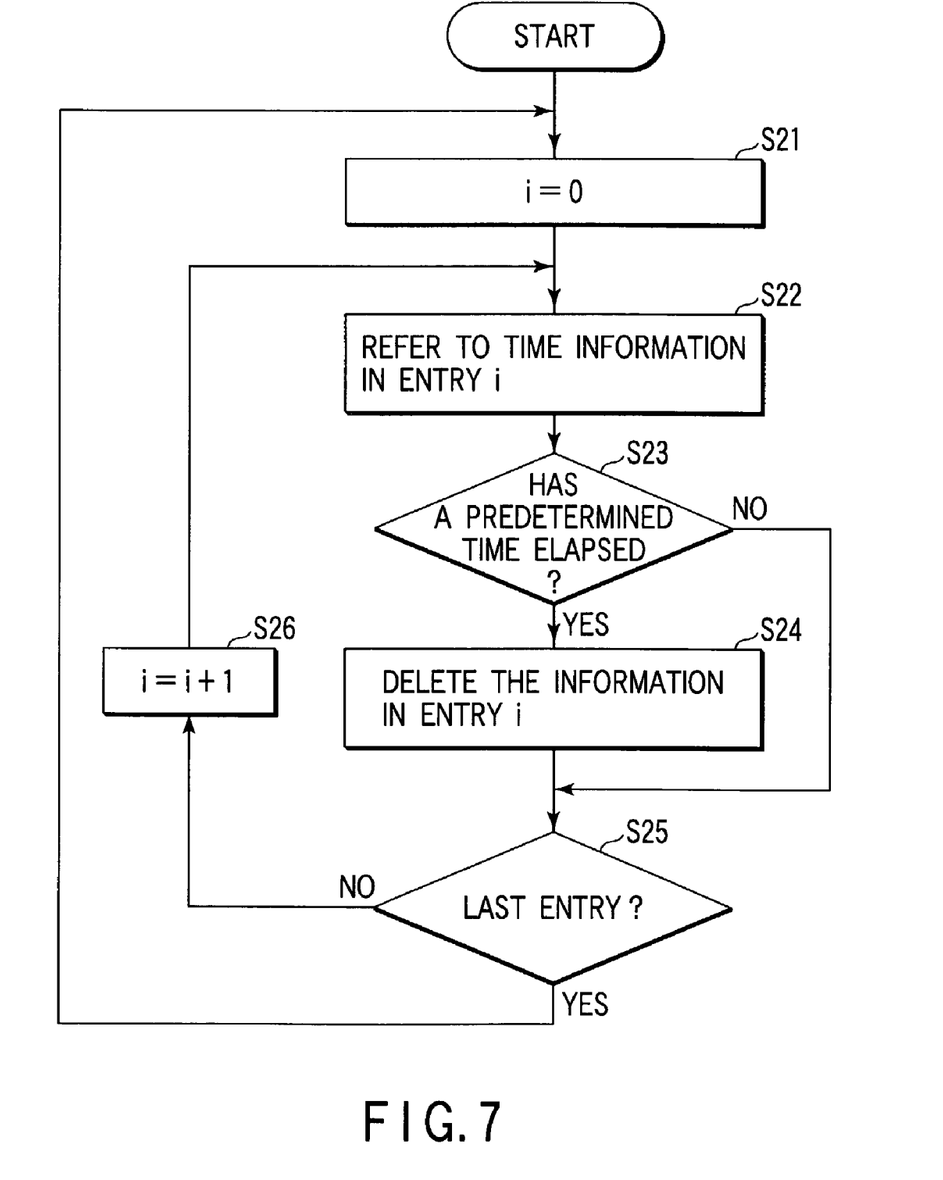
FIG. 7 is a flowchart to help explain the procedure for deleting the direct-dialing connection information stored in the direct-dialing extension table 112.

The private branch exchange 11 refers to the time information in each entry i (i=0, 1, . . . ) of the direct-dialing extension table 112 periodically (steps S21, S22). Then, the private branch exchange 11 determines whether the time that has elapsed from the time indicated by the time information to the present time is longer a predetermined time (step S23). If the time has exceeded the predetermined time, the private branch exchange 11 deletes the information (or direct-dialing connection information) about the corresponding entry i from the direct-dialing extension table 112 (step S24).

Consequently, the direct-dialing connection information including, for example, the calling telephone number "090-ZZZ-YYY-111," the outside-line telephone number "03-XXXX-1112" subjected to direct-dialing connection, and the extension number "3002" to be directly dialed is deleted from the table 112 after a predetermined time has elapsed since 10:01. From this time on, when the Web telephone 50 dials the extension telephone number "03-XXXX-1112," step S14 is executed as in normal direct dialing, thereby calling up a specific telephone or all the extension group 15-2 (or all the extension telephones belonging to the extension group 15-2) corresponding to the outside-line telephone number "03-XXXX-1112." This prevents only an unexpected specific telephone from receiving an incoming call on the basis of the old direct-dialing connection information. When only one outside-line telephone number is managed (or directly dialed) by the private branch exchange 11, the outside-line telephone number may be omitted from the direct-dialing connection information stored in the direct-dialing extension table 112.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of connecting a telephone with a Web browser to an extension of a private branch exchange, comprising:

transferring a list from a specific Web server to said telephone when said telephone requests extension telephone directory service from the specific Web server via the Internet, said list including extension groups and users belonging to said extension groups, and said extension groups and said users being managed by said private branch exchange;

causing said Web server to acquire, from said private branch exchange, information about said extension groups and users belonging to said extension groups, numbers of the extension telephones used by the users, and numbers of outside-line telephones direct-dialing-connectable to the extension telephones, and to store the information in an extension telephone directory storage unit, wherein the information stored in said extension telephone directory storage unit contains state information, acquired by said Web server from said private branch exchange, for the number of each extension telephone managed by said private branch exchange, said state information indicating whether a present communication state of the extension telephone associated with the number of the extension telephone is an idle state or a busy state;

generating said list from the information stored in said extension telephone directory storage unit, when said telephone accesses said Web server via the Internet;

causing said Web server to determine, from the corresponding state information in said extension telephone directory storage unit, whether a user can communicate when the user is selected from said list on said telephone;

transmitting the state indicated by said state information, from said Web server to said telephone via the Internet, when said selected user cannot communicate;

transmitting data representing a number of an outside-line telephone, from said Web server to said telephone via the Internet, when said selected user can communicate, said outside-line telephone being connectable, by direct dialing, to the telephone used by the selected user;

transmitting direct-dialing connection information from said Web server to said private branch exchange when said selected user can communicate, said direct-dialing connection information including the telephone number of said telephone and the number of the extension telephone used by said selected user; and causing the private branch exchange to call the extension telephone of the number transmitted from said Web server to said private branch exchange and to connect the extension telephone to said telephone, when said private branch exchange receives an incoming call from said telephone that has received said outside-line telephone number.

2. The method according to claim 1, further comprising:

storing the direct-dialing connection information into said private branch exchange when said Web server transmits the direct-dialing connection information to said private branch exchange; and retrieving the extension number from the corresponding direct-dialing connection information stored in said private branch exchange, when said private branch exchange receives an incoming call.

3. The method according to claim 1, wherein the direct-dialing connection information transmitted from said Web server to said private branch exchange includes a number of an outside-line telephone that is direct-dialing-connectable to the telephone used by the selected user.

4. The method according to claim 3, further comprising:

storing the direct-dialing connection information into said private branch exchange when said Web server transmits the direct-dialing connection information to said private branch exchange; and retrieving the extension number from the corresponding direct-dialing connection information stored in said private branch exchange, by using a pair of said telephone of the calling party and the outside-line telephone number of the called party as a key, when said private branch exchange receives an incoming call.

5. The method according to claim 1, wherein the direct-dialing connection information transmitted to said private branch exchange by said Web server includes an outside-line telephone number direct-dialing-connectable to the telephone used by said selected user.

6. The method according to claim 5, wherein the number of the outside-line telephone direct-dialing-connectable to the telephone used by said selected user and the number of the extension telephone used by said selected user, both included in the direct-dialing connection information transmitted to said private branch exchange by said Web server, are acquired from the information stored in said extension telephone directory storage unit.

7. The method according to claim 1, wherein the number of the outside-line telephone direct-dialing-connectable to the telephone used by said selected user, which has been transmitted to said telephone by said Web server, is acquired from the information stored in said extension telephone directory storage unit.

8. The method according to claim 1, wherein the information stored in said extension telephone directory storage unit contains state information which said Web server has acquired from said private branch exchange, for the number of each extension telephone managed by said private branch exchange, said state information indicating whether a user of the extension telephone associated with the number of the extension telephone is present or absent.

9. The method according to claim 8, wherein said Web server communicating with a Computer Telephony Integration server acquires the state information indicating said user presence or user absence from the Computer Telephony Integration server.

10. The method according to claim 1, further comprising deleting the direct-dialing connection information when said direct-dialing connection information remains stored in said private branch exchange longer than a predetermined time.

11. The method according to claim 10, wherein each piece of the direct-dialing connection information stored in said private branch exchange further includes-time information representing the time at which the information was stored, and in order to delete the direct-dialing connection information, the time information added to each piece of said direct-dialing connection information stored in said private branch exchange is referred to periodically, each time determining whether a predetermined time has elapsed from the time indicated by the time information.

12. An article of manufacture comprising a computer-usable medium having computer-readable program code means embodied therein, the computer-readable program code means in said article of manufacture comprising:

computer-readable program code means for causing a Web server computer to transfer a list to a telephone via the Internet when said telephone having a Web browser requests extension telephone directory service for direct-dialing connection via the Internet, said list including the extension groups managed by a private branch exchange and users belonging to the groups;

computer-readable program code means for causing said Web server computer to acquire, from said private branch exchange, information about said extension groups and users belonging to said extension groups, numbers of the extension telephones used by the users, and numbers of outside-line telephones direct-dialing-connectable to the extension telephones, and to store the information in an extension telephone directory storage unit, wherein the information stored in said extension telephone directory storage unit contains state information that said Web server acquired from said private branch exchange, for the number of each extension telephone managed by said private branch exchange, said state information indicating whether a present communication state of the extension telephone associated with the number of the extension telephone is an idle state or a busy state;

computer-readable program code means for causing said Web server computer to generate said list from the information stored in said extension telephone directory storage unit, when said telephone accesses said Web server via the Internet;

computer-readable program code means for causing said Web server computer to determine, from the corresponding state information in said extension telephone directory storage unit, whether a user can communicate when the user is selected from said list on said telephone;

computer-readable program code means for causing said Web server computer to transmit the state indicated by said state information to said telephone via the Internet when said selected user cannot communicate;

computer-readable program code means for causing said Web server computer to transfer a number of an outside-line telephone direct-dialing-connectable to the telephone used by said selected user, to said telephone via the Internet, when said selected user can communicate; and computer-readable program code means for causing, when said selected user can communicate, said Web server computer to transmit direct-dialing connection information to the private branch exchange, said direct-dialing connection information including the telephone number of said telephone and the number of the extension telephone used by said selected user, whereby when said private branch exchange receives an incoming call via a public switched telephone network from said telephone that has received the number of said outside-line telephone, said private branch exchange directly calls the extension telephone and connects the extension telephone to said telephone upon receipt of the number of the said outside-line telephone from said Web server computer.

13. A Web server computer that has an extension telephone directory service function for direct-dialing connection and that is applied to a communication system for connecting a telephone with a browser to an extension of a private branch exchange, said Web server computer comprising:

an extension telephone directory storage unit that stores extension telephone directory data including extension groups, users belonging to said extension groups, numbers of extension telephones used by the users, and numbers of outside-line telephones direct-dialing-connectable to the extension telephones, each piece of the extension telephone directory data being managed by the private branch exchange, said extension telephone directory storage unit storing, for each of said extension numbers, state information indicating whether a present communication state of the extension telephone with the extension number is an idle state or a busy state;

storage means for communicating with said private branch exchange and for storing, in said extension telephone directory storage unit, information about said extension groups, the users belonging to said extension groups, the numbers of the extension telephones used by the users, and numbers of outside-line telephones direct-dialing-connectable to the extension telephones;

means for, when said telephone requests extension telephone directory service via the Internet, generating a list including extension groups managed by said private branch exchange and the users belonging to said managed extension groups on the basis of the contents of said storage unit and transferring the list to said telephone via the Internet;

means for determining whether a user can communicate on the basis of the corresponding state information in said extension telephone directory storage unit, when the user is selected from said list on said telephone that has requested said extension telephone directory service;

means for transmitting the state indicated by said state information to said telephone via the Internet when said selected user cannot communicate;

means for, when said selected user can communicate, retrieving, from said storage unit, an outside-line telephone number direct-dialing-connectable to the telephone used by said selected user and the extension number of the extension telephone used by the selected user;

means for transmitting said retrieved number of the direct-dialing-connectable outside-line telephone via the Internet to said telephone which has requested said extension telephone directory service; and means for transmitting direct-dialing connection information to said private branch exchange and causing said private branch exchange to directly call the extension telephone having the notified extension number and connect the extension telephone to said telephone when said private branch exchange receives an incoming call from said telephone, said direct-dialing connection information including the telephone number of said telephone which has requested said extension telephone directory service and said retrieved extension number.

14. The Web server computer according to claim 13, wherein said storage unit stores, for each of said extension numbers, state information indicating one of a plurality of user states including a presence and an absence of a user of the extension telephone with the extension number.

* * * * *